(12) United States Patent
Yang et al.

(10) Patent No.: US 9,346,143 B2
(45) Date of Patent: May 24, 2016

(54) LATHE FOR MACHINING CURVED SURFACES

(71) Applicants: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(72) Inventors: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 739 days.

(21) Appl. No.: 13/705,713

(22) Filed: Dec. 5, 2012

(65) Prior Publication Data

US 2014/0020526 A1 Jan. 23, 2014

(30) Foreign Application Priority Data

Jul. 20, 2012 (CN) .......................... 2012 1 0252849

(51) Int. Cl.
| | |
|---|---|
| *B23Q 1/01* | (2006.01) |
| *B23Q 5/34* | (2006.01) |
| *B23B 3/06* | (2006.01) |
| *B23Q 1/62* | (2006.01) |
| *B23Q 5/28* | (2006.01) |
| *B23B 5/36* | (2006.01) |
| *B23Q 1/25* | (2006.01) |

(52) U.S. Cl.
CPC ... *B23Q 5/34* (2013.01); *B23B 3/06* (2013.01); *B23B 5/36* (2013.01); *B23Q 1/012* (2013.01); *B23Q 1/017* (2013.01); *B23Q 1/626* (2013.01); *B23Q 5/28* (2013.01); *Y10T 82/2511* (2015.01); *Y10T 82/2531* (2015.01)

(58) Field of Classification Search
CPC ...... B23Q 11/0816; B23Q 1/015; B23Q 5/28; B23Q 5/236; B23Q 5/34
See application file for complete search history.

(56) References Cited

U.S. PATENT DOCUMENTS

| | | | | |
|---|---|---|---|---|
| 4,346,444 A | * | 8/1982 | Schneider | .......... G05B 19/4163 318/571 |
| 4,451,892 A | * | 5/1984 | McMurtry | ............. G01B 7/008 318/572 |
| 4,658,485 A | * | 4/1987 | Yang | ...................... B23Q 1/012 29/26 A |
| 4,741,231 A | * | 5/1988 | Patterson | ................... G01L 1/16 310/338 |
| 6,348,746 B1 | | 2/2002 | Fujisawa et al. | |
| 7,192,225 B2 | * | 3/2007 | Takayama | .......... B23Q 11/0816 409/134 |
| 8,529,420 B2 | * | 9/2013 | Meidar | ................... B23Q 1/012 29/33 P |
| 8,845,246 B2 | * | 9/2014 | Tullmann | ............... B23Q 1/012 409/189 |
| 2006/0052038 A1 | * | 3/2006 | Klein | ...................... B23Q 5/10 451/11 |
| 2006/0270540 A1 | | 11/2006 | Takayama et al. | |
| 2010/0207496 A1 | * | 8/2010 | Tatsuda | ................... B23Q 1/70 310/67 R |

FOREIGN PATENT DOCUMENTS

| | | |
|---|---|---|
| DE | 19650360 A1 | 5/1998 |
| DE | 102009058649 A1 | 6/2011 |
| JP | 2004-130468 A | 4/2004 |
| JP | 2006-326740 A | 12/2006 |
| JP | 2008-221444 A | 9/2008 |
| TW | 553045 | 9/2003 |
| TW | M279438 | 11/2005 |
| TW | M286741 | 2/2006 |

* cited by examiner

*Primary Examiner* — Will Fridie, Jr.
(74) *Attorney, Agent, or Firm* — Novak Druce Connolly Bove + Quigg LLP

(57) ABSTRACT

A lathe includes a machine support, a work table, a moving device and a feeding device. The work table is rotatably positioned on the machine support for driving a workpiece placed on the work table to rotate. The moving device is movably mounted, slidably on the machine support along a first direction above the work table. The feeding device is slidably positioned on the moving device along a second direction vertical to the first direction, the feeding device includes a cutter. The feeding device drives the cutter backwards and forwards under precise control at high speed along a third orthogonal direction for machining the workpiece.

19 Claims, 6 Drawing Sheets

LATHE FOR MACHINING CURVED SURFACES

CROSS-REFERENCE TO RELATED APPLICATIONS

This application claims all benefits accruing under 35 U.S.C. §119 from China Patent Application No. 201210252849.9, filed on Jul. 20, 2012, in the China Intellectual Property Office, the disclosure of which is incorporated herein by reference. The application is also related to co-pending applications entitled, "MACHINE TOOL WITH UNINTERRUPTED CUTTING"; "FEEDING DEVICE AND MACHINE TOOL USING THE SAME"; "METHOD FOR MACHINING CURVED SURFACE USING LATHE"; "FEEDING DEVICE AND MACHINE TOOL USING THE SAME"; "LATHE WITH TWO CROSS BEAMS"; "LATHE CONTROL SYSTEM"; "WORKPIECE HAVING NON-ROTATARY SURFACE MACHINED BY LATHE"; "LATHE FOR MACHINING CURVED SURFACES".

BACKGROUND

1. Technical Field

The present disclosure generally relates to lathes, and particularly, to a lathe which can machine a curved surface.

2. Description of the Related Art

In the related manufacturing field, a milling cutter with different cutting edges is used for machining curved surfaces. Some tracks are formed on the milled surface of the workpiece because of intermitted contact and interrupted milling by the milling cutter. A polish step needs to be added for a better appearance. When a lathe is used for machining curved surfaces, only a two dimensional curved surface with rotary feature can be machined because the movement of a cutter of the lathe is limited.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
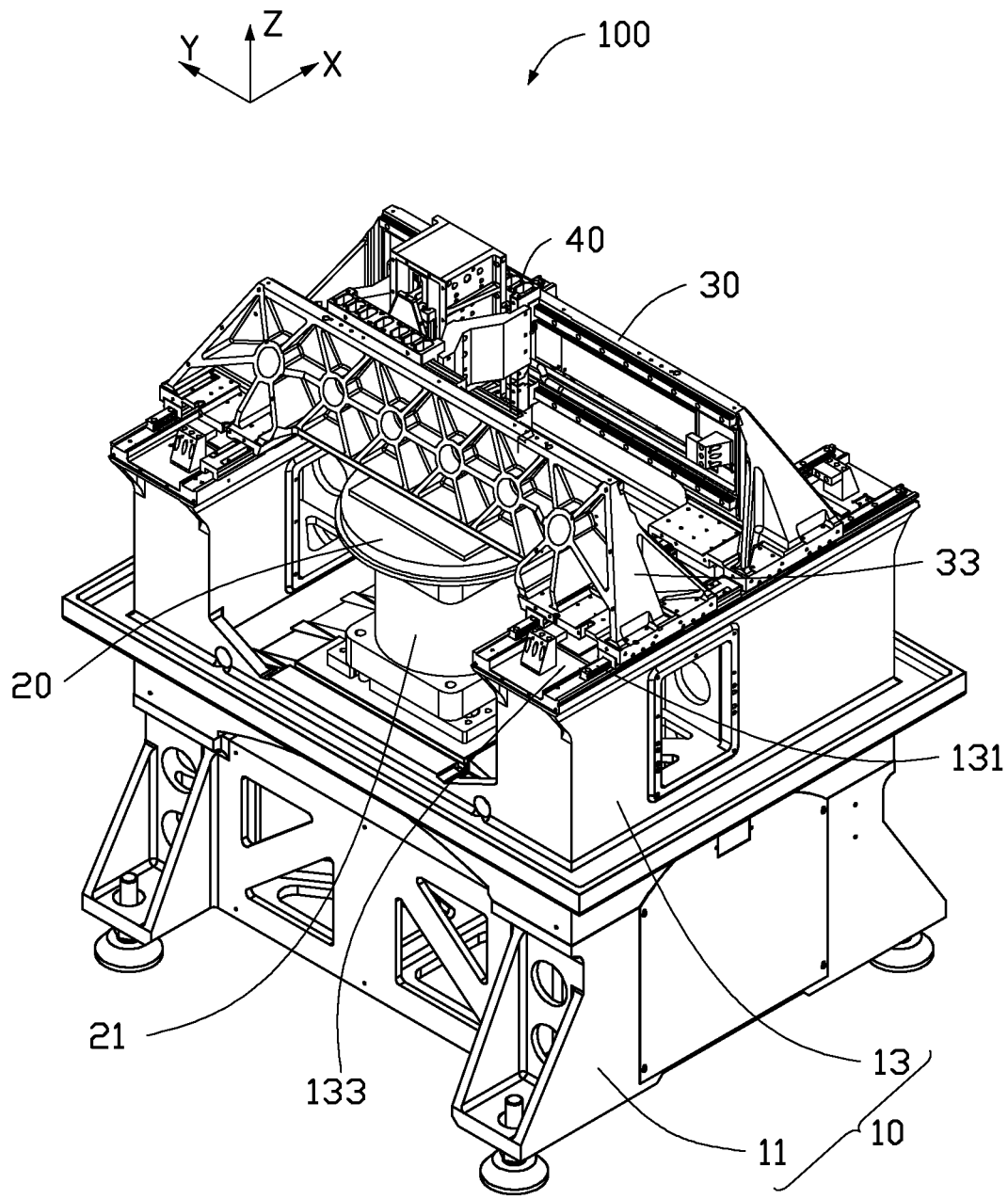
FIG. 1 is an isometric view of an embodiment of a lathe having a feeding device and a work table.
Figure 2:
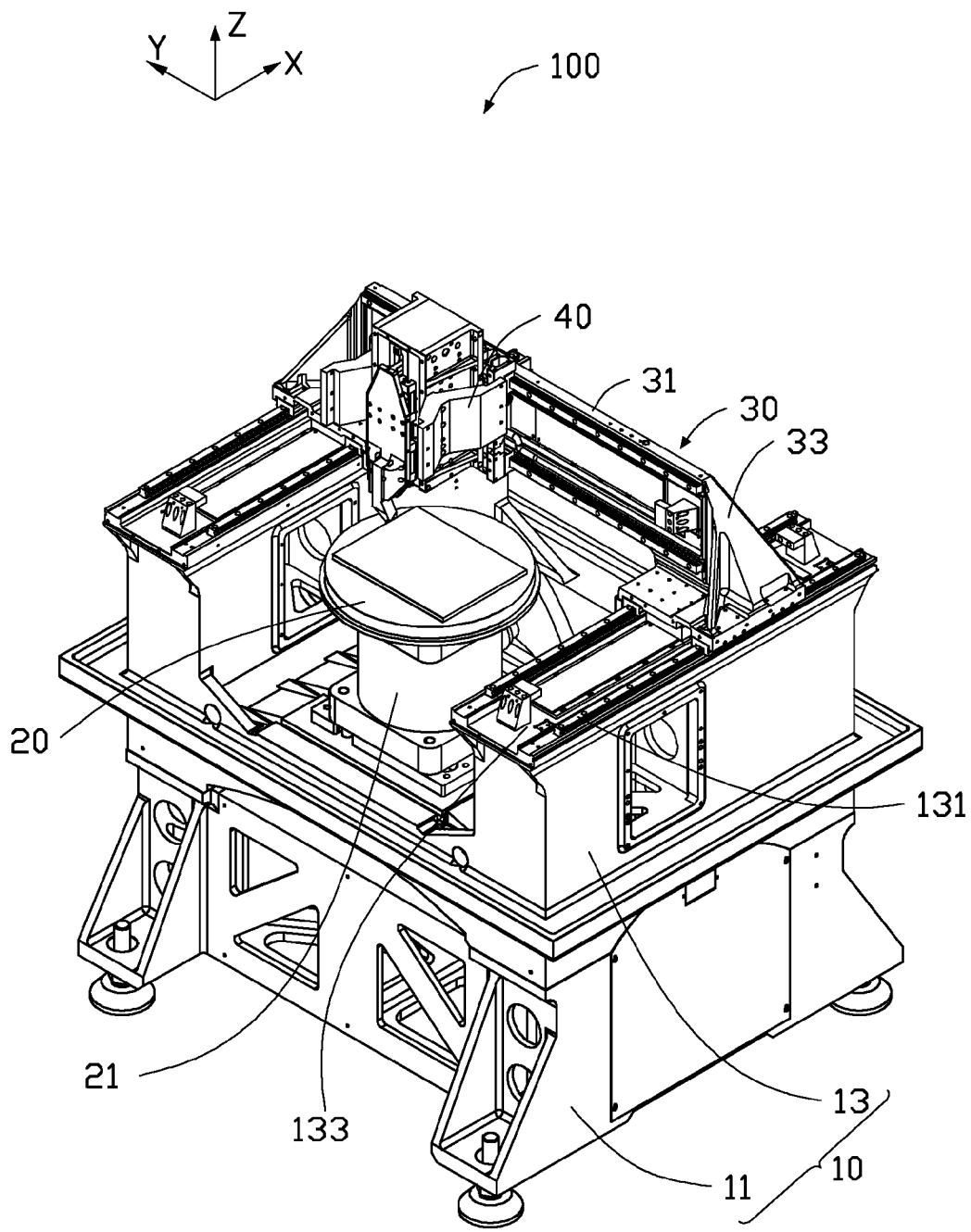
FIG. 2 is a partial, isometric view of the lathe of FIG. 1.

FIGS. 1 and 2 show an embodiment of a lathe 100. The lathe 100 includes a machine support 10, a work table 20, a moving device 30, a feeding device 40, and a controller (not shown). The work table 20 holds a workpiece in place and is supported by the machine support 10. The moving device 30 is movably positioned on the machine support 10 above the work table 20. The feeding device 40 is slidably mounted on the moving device 30. The controller is electrically connected with the work table 20, the moving device 30, and the feeding device 40 for controlling the lathe 100. Under the control of the controller, the moving device 30 can be driven to move with the feeding device 40, such that the feeding device 40 can be driven to move along the X, the Y, and the Z axes.

The machine support 10 includes a base 11 and a pair of support bodies 13 positioned substantially parallel on the base 11. A pair of first sliding rails 131 are positioned substantially parallel on a surface of each support body 13 away from the base 11, and arranged apart from each other. In the illustrated embodiment, the first sliding rails 131 extend substantially parallel to the X-axis (a first direction). A receiving groove 133 is formed on each support body 13 between the two first sliding rails 131.

Referring also to FIG. 2, the work table 20 is substantially cylindrical, and rotatably positioned on the base 11 between the two support bodies 13 via the rotating driver 21. The rotating driver 21 drives the work table 20 and a workpiece placed on the work table 20 to rotate. In the illustrated embodiment, the rotating driver 21 is a direct drive motor.

Figure 3:
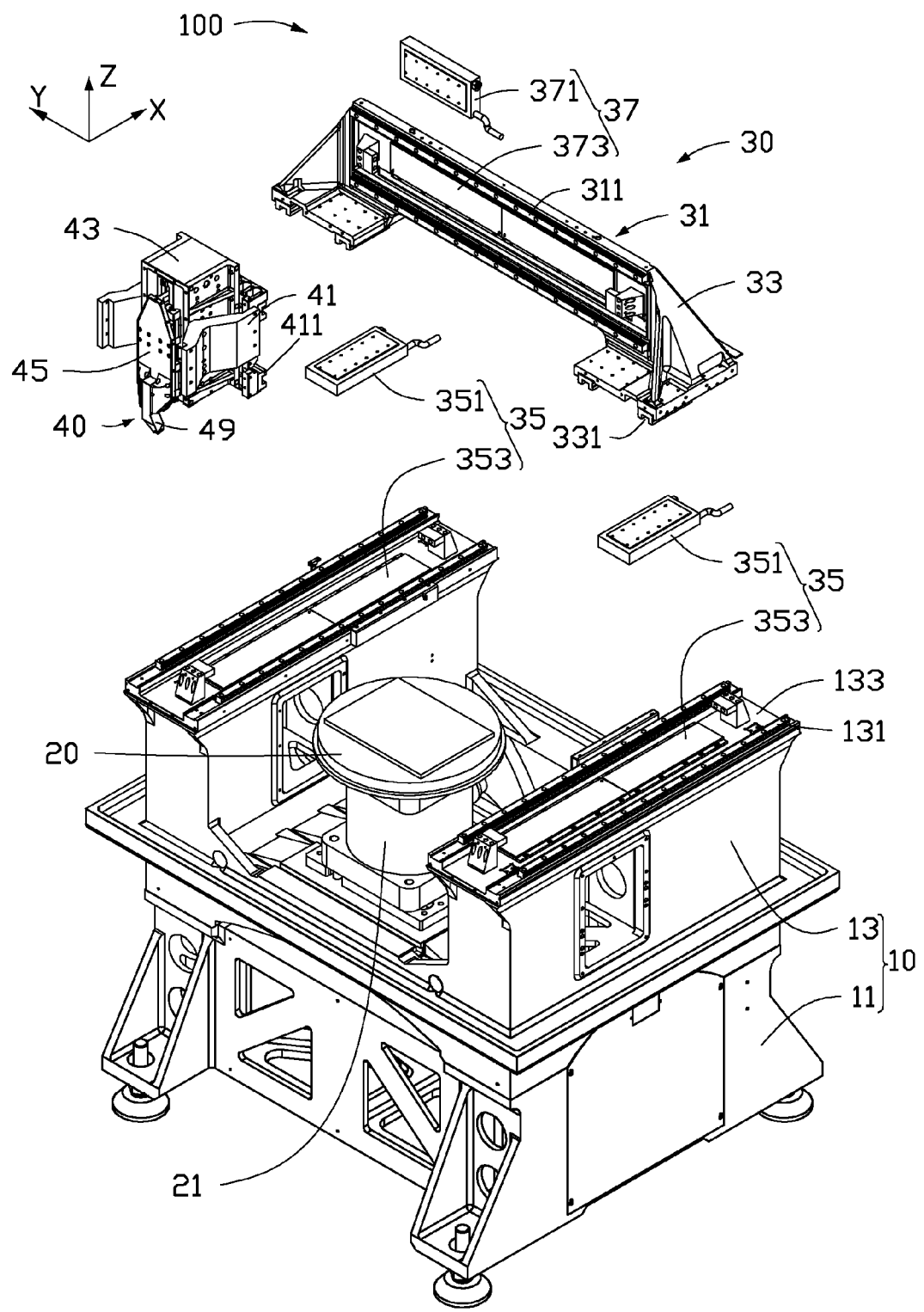
FIG. 3 shows an exploded and isometric view of the lathe of FIG. 2

Referring also to FIG. 3, the moving device 30 is slidably mounted on the pair of support bodies 13 above the work table 20. The moving device 30 includes two cross beams 31, four sliding bases 33, four first driving mechanisms 35, and two second driving mechanisms 37. The two cross beams 31 are positioned spaced apart on the support bodies 13 for high stability. Opposite ends of each cross beam 31 are slidably positioned on the support bodies 13 via a pair of sliding bases 33, respectively. The extending direction of the cross beam 31 is substantially parallel to the Y-axis (a second direction). A pair of second sliding rails 311 is positioned on a side surface of each cross beam 31 and extending substantially parallel to the Y-axis. Two side surfaces having the second sliding rails 311 of the cross beams 31 are positioned face to face. Two sliding bases 33 are installed on the opposite ends of the corresponding cross beam 31 to slidably connect with the first sliding rails 131. The sliding base 33 includes a first sliding block 331 slidably engaging with the first sliding rails 131. Each first driving mechanism 35 is mounted on a surface of one sliding base 33 away from the cross beam 31 and received in one receiving groove 133.

The first driving mechanisms 35 are configured to drive the cross beams 31 to move along the first sliding rails 131. Each of the first driving mechanisms 35 includes a first forcer 351 and a first stator 353. The first forcer 351 is fixedly mounted on the sliding base 31 facing the receiving groove 133. Two first stators 353 are fixedly received in each of the receiving grooves 133. One second driving mechanism 37 is mounted on each of the cross beams 31 between two second sliding rails 311 to drive the feeding device 40 to move along the second sliding rails 311. Each of the second driving mechanisms 37 includes a second forcer 371 and a second stator 373. Each of the second forcers 371 are fixedly mounted on each of the opposite surfaces of the feeding device 40 facing the cross beams 31. Both of the second stators 373 are installed on each of the cross beams 31 between two second sliding rails 311. The first driving mechanisms 35 and the second driving mechanism 37 are electrically connected to the controller. In the illustrated embodiment, the first driving mechanisms 35 and the second driving mechanism 37 are linear motors. In other embodiments, the first driving mechanisms 35 and the second driving mechanism 37 are other drivers, such as hydraulic cylinders or rams. The number of the first driving mechanisms 35, the second driving mechanism 37, and the cross beam 31 can be designed according to their applications.

Figure 4:
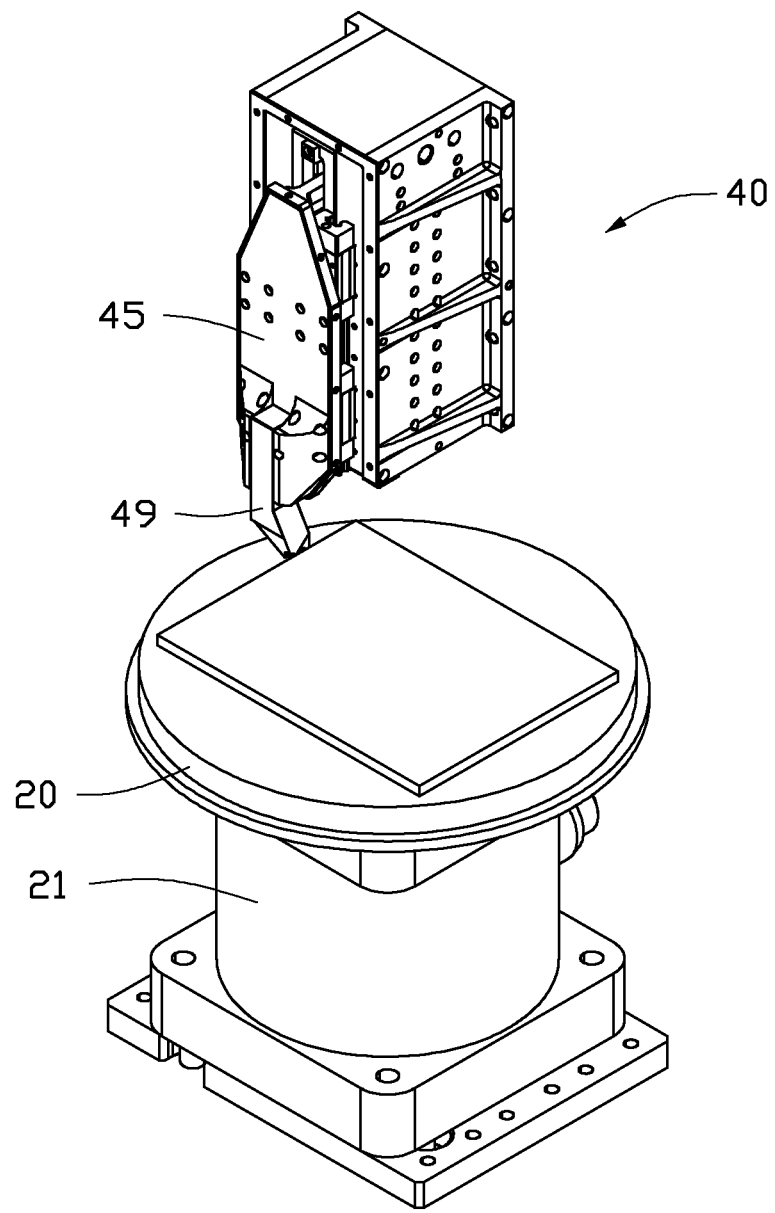
FIG. 4 shows an isometric view of the feeding device and the work table of the lathe of FIG. 1.
Figure 5:
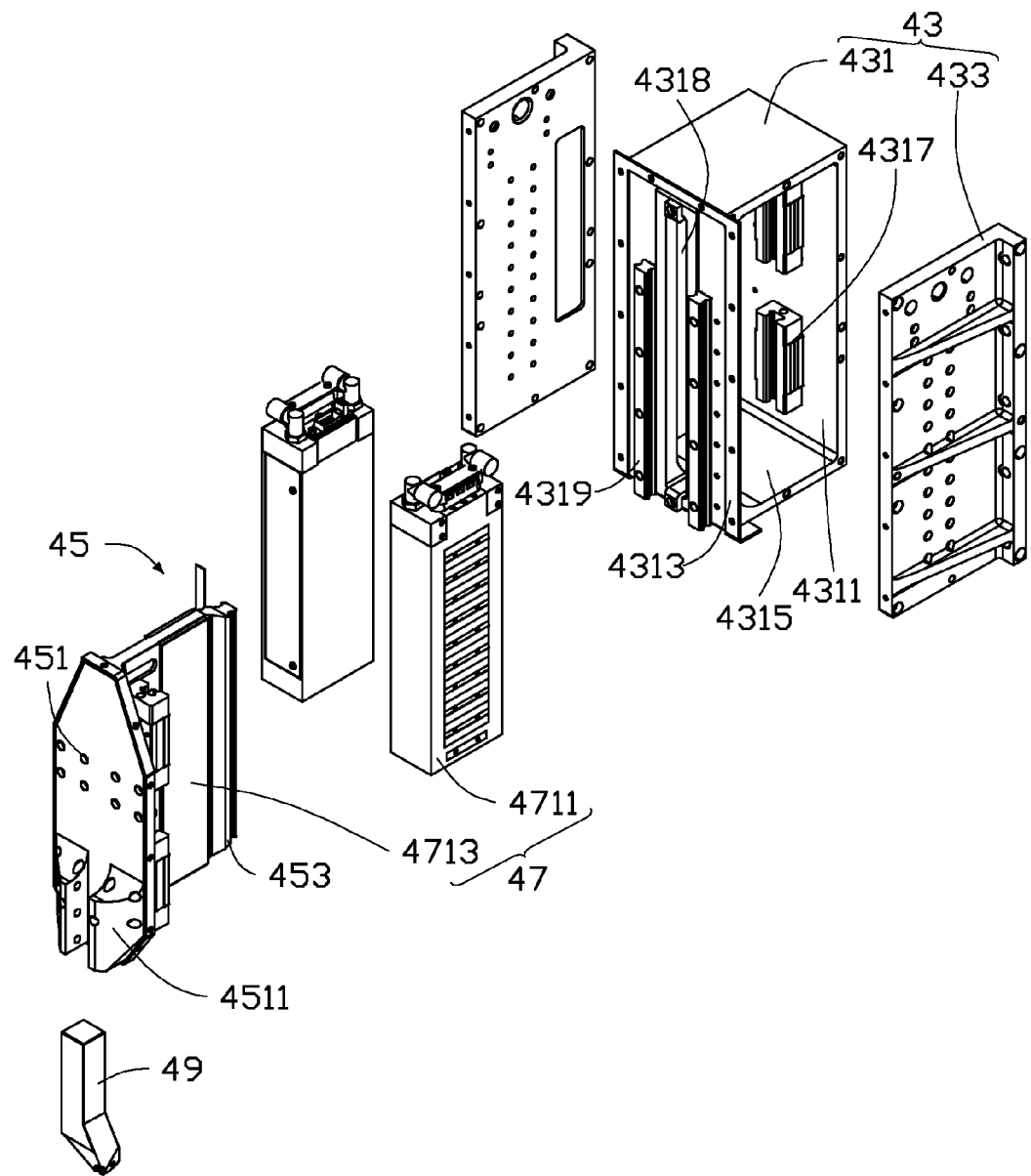
FIG. 5 is an exploded, isometric view of the feeding device of FIG. 1.
Figure 6:
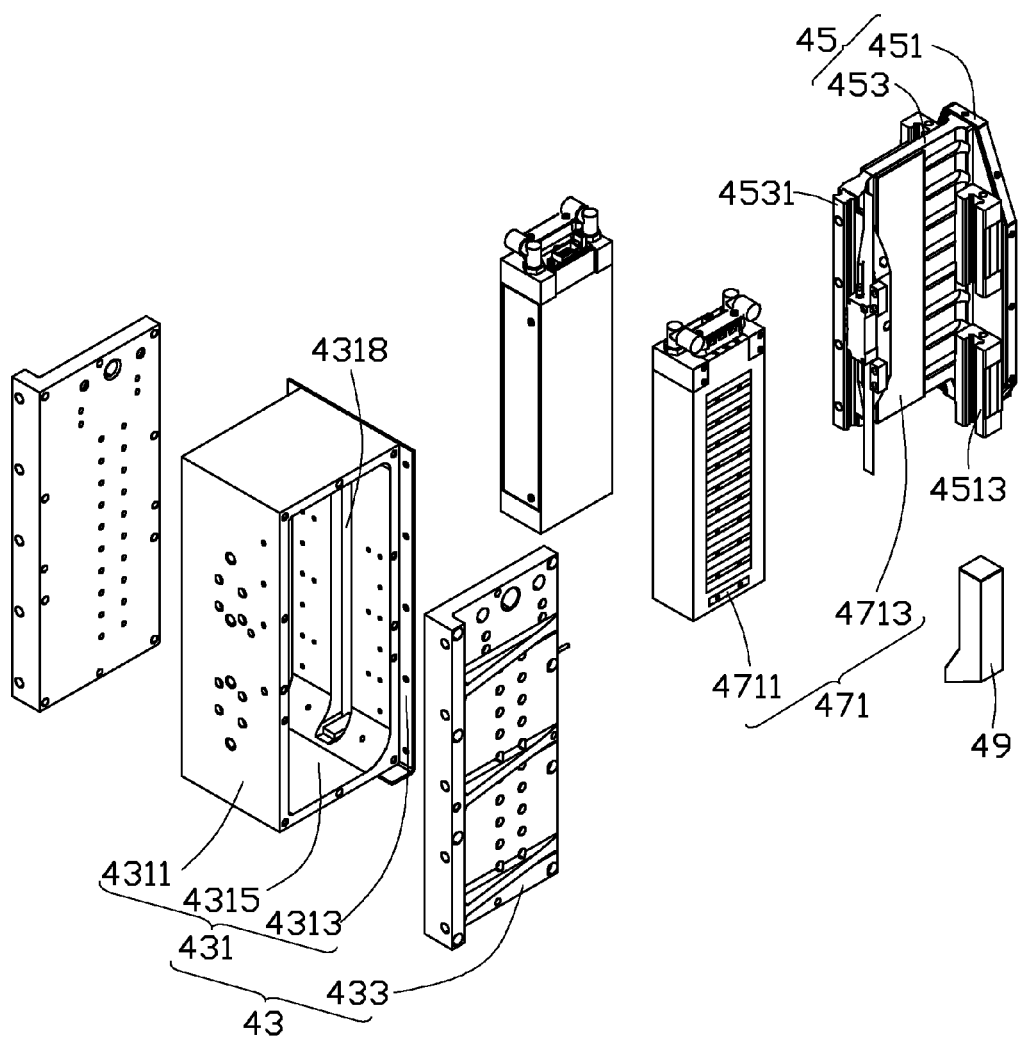
FIG. 6 is similar to FIG. 5, but viewed from another aspect.

FIGS. 3 to 5 shows that the feeding device 40 is slidably positioned between the two cross beams 31. The feeding device 40 includes a sliding saddle 41, a mounting seat 43, a tool holder 45, a feeding mechanism 47, and a cutter 49. The sliding saddle 41 is movably assembled with the cross beams 31. The mounting seat 43 is slidably connected to the sliding saddle 41 away from the cross beam 31. The feeding mechanisms 47 are mounted and received in the mounting seat 43 to electrically connect with the controller. The tool holder 45 is slidably positioned on the mounting seat 43, and has a reciprocating motion substantially parallel to the Z-axis (the Z-axis direction, a second direction) relative to the mounting seat 43.

The sliding saddle 41 is slidably positioned between the two cross beams 31. Two second sliding blocks 411 are separately positioned on opposite surfaces of the sliding saddle 41 away from the tool holder 45, and substantially parallel to the Y-axis towards the cross beam 31. The second sliding blocks 411 are slidably engaged with the correspondingly second sliding rails 311. Each of the second forcers 371 is positioned between the two second sliding blocks 411.

The mounting seat 43 includes a frame 431 and two mounting boards 433. The frame 431 includes a first side wall 4311 and a second side wall 4313. The first side wall 4311 and the second side wall 4313 are positioned substantially parallel to each other and cooperatively define a receiving space 4315. The first side wall 4311 is slidably connected with the sliding saddle 41. Two guiding portions 4317 protrude from an inner surface of the first side wall 4311 facing toward the second side wall 4315 and extend substantially parallel to the Z-axis. A through groove 4318 is defined in the second side wall 4313 and extends along a direction substantially parallel to the Z-axis corresponding to the guiding portions 4317. Two guiding portions 4319 protrude from an outer surface of the second side wall 4313 at two sides of the through groove 4318. In the illustrated embodiment, the guiding portions 4319 are sliding rails, the frame 431 is integrally formed. Two mounting boards 433 are respectively installed on two opening sides of the frame 431. Each mounting board 433 is connected substantially perpendicularly to the first wall 4311 and the second side wall 4313 to close the two opening sides of the frame 431.

The tool holder 45 slidably connects with the mounting seat 43. The tool holder 45 is substantially "T" shaped, and includes a main body 451 and a sliding board 453 protruding substantially perpendicularly from the main body 451. The main body 451 is a bar of material tapering in at both ends, and positioned outside of the mounting seat 43. Two distanced holding portions 4511 are positioned on a bottom of the main body 451 away from the sliding board 453. Four first direct portions 4513 (see FIG. 5) are positioned on a surface of the main body 451 adjacent to the sliding board 453. The four first direct portions 4513 are divided into two groups, each group having two first direct portions 4513 slidably engaging with one guiding portion 4319. The sliding board 453 is located between the two groups of the first direct portions 4513. The sliding board 453 passes through the through groove 4318 and is slidably attached to the two guiding portions 4317, dividing the receiving space 4315 into two parts. A second direct portion 4531 is formed on an end of the sliding board 453 away from the main body 451, and received in the guiding portion 4317. In the illustrated embodiments, the first direct portions 4513 are sliding blocks, and the second direct portion 4531 is a sliding rail.

The feeding mechanism 47 is mounted in the mounting seat 43, and includes two drivers 471. The two drivers 471 are received in the receiving space 4315 and positioned on two sides of the sliding board 453, respectively. In the illustrated embodiment, the drivers 471 are linear motors. Each driver 471 includes a forcer 4711 and a stator 4713. Each forcer 4711 is fixed to a surface of each of the mounting boards 433. The sliding board 453 is positioned between the two forcers 4711. The forcers 4711 produce alternating magnetic fields when the forcers 4711 are supplied with an alternating electrical current. Two stators 4713 are respectively attached on the opposite surfaces of the sliding board 453. Each stator 4713 is located between a forcer 4711 and the sliding board 453. Interactions between magnetic fields produced by the stators 4713 and the alternating magnetic fields which are produced by the forcers 4711 drive the tool holder 45 in a reciprocating motion at a high speed along the direction of the Z-axis. In other embodiments, the number of drivers 471 can be designed according to application. For example, the two drivers 471 can replace a single driver with more power, or three or more drivers can be positioned to drive the tool holder 45 to maximize the available power, and simplify assembly of the drivers.

The cutter 49 is clamped between the two holding portions 4511 for machining curved surfaces of the workpiece.

In other embodiments, the mounting seat 43 may be attached on the sliding saddle 41 when the lathe 100 machines the workpiece of one type. In other words, the mounting seat 43 does not need to move along the Z-axis direction. A driving mechanism electrically connected with the controller may be positioned in the feeding device 40 to drive the mounting seat 43 to slide along the sliding saddle 41 in the Z-axis. The sliding saddle 41 may be omitted, and the mounting seat 43 can be directly slidably positioned on the cross beam 31.

In other embodiments, the forcers 4711 may be directly installed on the frame 431. The alternating magnetic fields produced by the forcers 4711 drive the stators 4713, thereby causing the tool holder 45 to undergo a reciprocating motion at high speed along the guiding portions 4317.

In assembly, the work table 20 is positioned between the two support bodies 13. The cross beams 31 are installed on the two support bodies 13 via the sliding bases 33. The first driving mechanism 35 and the second mechanism 37 are mounted on the moving device 30 and elastically connected with the controller. The sliding saddle 41 is also positioned on the cross beam 31. The two stators 4713 are fixedly mounted on two surfaces of the sliding board 453. The sliding board 453 passes through the through groove 4318 and slidably connects with the second direct portion 4531. Each forcer 4711 is installed on one mounting board 433 and received in the mounting seat 43 together with the mounting board 433. The cutter 49 is fixedly mounted between the two holding portions 4511. Finally, the feeding device 40 is positioned on the sliding saddle 41 and electrically connected to the controller.

In use, the workpiece is placed on the work table 20. The feeding device 40 moves and arrives at a position above the workpiece. The first driving mechanism 35 drives the moving device 30 to move along the first sliding rails 131 in the X-axis direction, the rotating driver 21 drives the workpiece to rotate, and the cutter 49 is driven to move back and forth at high speed in the Z-axis direction by the drivers 471 for machining the workpiece. The rotating speed of the rotating driver 21, the speed and the range movement of the cutter 49 are programmed according to cutting required for each machining portion of the workpiece. A three dimensional curved surface will be machined because the cutting removal of the workpiece along the rotating direction in the Z-axis is different. The planar machining path of the cutter 49 is substantially spiral. The feeding device 40 and the work table 20 stop moving, and the moving device 30 returns to the initial position after completing the machining. The workpiece can then be unloaded from the work table 20.

The feeding device 40 is capable of moving along X-axis and Y-axis via the moving device 30 and feeding with high speed in Z-axis for machining three dimensional curved surfaces. Compared with the conventional milling cutter machining, no other process needs to be performed on the workpiece used by the lathe 100 because the cutter 49 is continuously machining in three directions at one time. In addition, the work table 20 is directly driven to rotate by the rotating driver 21, such that the work table 20 is capable of adjustments with great torsion.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A lathe, comprising:
    a machine support;
        a work table rotatably positioned on the machine support for driving a workpiece held on the work table to rotate;
        a moving device movably slidably mounted on the machine support along a first direction above the work table; and
    a feeding device slidably positioned on the moving device along a second direction at ninety degrees from the first direction, the feeding device comprising a cutter, a mounting seat positioned on the moving device, a tool holder slidably engaging with the mounting seat, and a feeding mechanism,
    wherein the feeding device drives the cutter to move back and forth under precise control at high speed along a third direction for machining the workpiece, the third direction being substantially perpendicular to the first and second direction,
    wherein the cutter is fixed installed on the tool holder, and the feeding mechanism is mounted and received in the mounting seat for controlling the tool holder to move along the third direction relative to the mounting seat, the tool holder comprises a main body and a sliding board protruding from the main body, the main body is positioned outside of the mountings seat, and the sliding board extends into the mounting seat.

2. The lathe of claim 1, wherein the machine support comprises a base and a pair of support bodies positioned substantially parallel on the base along the second direction, a pair of first sliding rails are positioned substantially parallel on a surface of each of the pair of the support bodies away from the base, the moving device comprises at least one cross beam and at least two bases, the at least two sliding bases are positioned on opposite ends of the at least one cross beam, and each of the sliding bases comprises two first sliding blocks slidably engaging with the pair of first sliding rails to move along the first direction.

3. The lathe of claim 2, wherein the moving device further comprises at least one first driving mechanism comprising at least one first forcer and at least one first stator, the at least one first forcer is fixedly mounted on the at least two sliding bases facing the pair of the support bodies, the least one first stator is fixedly mounted on the two support bodies, and the interactions between the at least one first forcer and the at least one first stator drive the at least one cross beam to move on the pair of support bodies.

4. The lathe of claim 3, wherein a receiving groove is formed on each of the pair of support bodies between the pair of first sliding rails, the at least one first stator is fixedly received in the receiving groove, and the at least one first forcer is slidably received in the receiving groove.

5. The lathe of claim 3, wherein the moving device further comprises at least one second driving mechanism comprising at least one second forcer and at least one second stator, the at least one second forcer is fixedly mounted on the feeding device, the at least one second stator is fixedly mounted on the at least one cross beams, and the interactions between the at least one second forcer and the at least one second stator drive the feeding device to move along the at least one cross beam.

6. The lathe of claim 5, wherein the at least one cross beam comprises at least one cross beam body and at least one pair of second sliding rails positioned on the at least one cross beam body facing toward the feeding device, the feeding device further comprises two second sliding blocks, the two second sliding blocks slidably engage with the at least one pair of second sliding rails, and the at least one second stator is positioned on the at least one cross beam between the pair of second sliding blocks.

7. The lathe of claim 1, wherein the mounting seat comprises a frame and two mounting boards, the frame comprises a first side wall and a second side wall positioned substantially parallel to the first side wall, two guiding portion are positioned on the first side wall and extends substantially parallel to the third direction, a through groove is defined at the second side wall corresponding to the two guiding portion positioned on first side wall, two guiding portions are positioned on the second side wall and at two sides of the through groove, the main body slidably connects with the two guiding portions, and the sliding board passes through the through groove.

8. The lathe of claim 7, further comprising two groups of first direct portions positioned on the main body to slidably engage with the two guiding portions on the second side wall, and a second direct portion positioned at an end of the sliding board away from the main body to slidably connect with the two guiding portion on the first side wall.

9. A lathe, comprising:
    a machine support, the machine support comprising a base and a pair of support bodies positioned on the base and being substantially parallel, a pair of first sliding rails being substantially parallel and being positioned on a surface of each of the pair of the support bodies away from the base;
    a work table rotatably positioned on the machine support for driving a workpiece held on the work table to rotate;
    a moving device movably slidably mounted on the machine support along a first direction above the work table, the moving device comprising at least one cross beam, at least two sliding bases, and at least one first driving mechanism, and the at least two sliding bases being positioned on opposite ends of the at least one cross beam, the at least one first driving mechanism comprising at least one first forcer and at least one first stator, the at least one first forcer is fixedly mounted on the at least two sliding bases, the least one first stator is fixedly mounted on each of the two support bodies, and interactions between the at least one first forcer and the at least one first stator drive the at least two sliding bases to move on the pair of support bodies; and
    a feeding device slidably positioned on the moving device along a second direction at ninety degrees from the first direction, the feeding device comprising a mounting seat, a feeding mechanism, and a cutter, wherein the mounting seat is positioned on the moving device, at least one guiding portion is positioned on the mounting seat along a third direction, the third direction is substantially perpendicular to the first and second direction; the feeding mechanism drives the cutter to move backwards and forwards under precise control at high speed along the at least one guiding portion for machining the workpiece.

10. The lathe of claim 9, wherein each sliding base comprises two first sliding blocks to slidably engage with the pair of first sliding rails to move along the first direction.

11. The lathe of claim 9, wherein a receiving groove is formed on each of the pair of support bodies between the pair of first sliding rails, the at least one first stator is fixedly received in the receiving groove of each of the pair of support bodies, and the at least one first forcer is slidably received in the receiving groove of the pair of support bodies.

12. The lathe of claim 9, wherein the moving device further comprises at least one second driving mechanism comprising at least one second forcer and at least one second stator, the at least one second forcer is fixedly mounted on the feeding device, the at least one second stator is fixedly mounted on the at least one cross beams, and the interactions between the at least one second forcer and the at least one second stator drive the feeding device to move along the at least one cross beam.

13. The lathe of claim 12, wherein the at least one cross beam comprises at least one cross beam body and at least one pair of second sliding rails positioned on the at least one cross beam body facing toward the feeding device, the feeding device further comprises two second sliding blocks, the two second sliding blocks slidably engage with the pair of second sliding rails, and the at least one second stator is positioned on the at least one cross beam between the pair of second sliding blocks.

14. The lathe of claim 9, wherein the feeding device further comprises a tool holder, the mounting seat is positioned on the moving device, the tool holder slidably engages with the at least one guiding portion, the cutter is fixed installed on the tool holder, and the feeding mechanism is mounted and received in the mounting seat for controlling the tool holder move along the third direction relative to the mounting seat.

15. The lathe of claim 14, wherein the tool holder comprises a main body and a sliding board protruding from the main body, the mounting seat comprises a frame and two mounting boards positioned at two sides of the frame, the frame comprises a first side wall and a second side wall positioned substantially parallel to the first side wall, the first side wall is positioned adjacent to the moving device, the at least one guiding portion is positioned on the first side wall.

16. The lathe of claim 14, wherein the tool holder comprises a main body and a sliding board protruding from the main body, the mounting seat comprises a frame and two mounting boards positioned at two sides of the frame, the frame comprises a first side wall and a second side wall positioned substantially parallel to the first side wall, the first side wall is positioned adjacent to the moving device, the at least one guiding portion is positioned on the second side wall.

17. The lathe of claim 16, wherein a through groove is defined in the second side wall, two guiding portions are positioned on the second side wall and positioned at two sides of the through groove, the main body slidably connects with the at least one guiding portion, and the sliding board passes through the through groove.

18. A lathe, comprising:
a machine support;
a work table rotatably positioned on the machine support for driving a workpiece held on the work table to rotate;
a moving device movably slidably mounted on the machine support along a first direction above the work table; and
a feeding device slidably positioned on the moving device along a second direction at ninety degrees from the first direction, the feeding device comprising a mounting seat, a feeding mechanism, a cutter, and a tool holder, the mounting seat being positioned on the moving device, the cutter being installed on the tool holder, the tool holder comprising a main body and a sliding board protruding from the main body, the mounting seat comprising a frame and two mounting boards positioned at two sides of the frame, the frame comprising a first side wall and a second side wall positioned substantially parallel to the first side wall, the first side wall being positioned adjacent to the moving device, the at least one guiding portion being positioned on the second side wall, and the feeding mechanism being mounted and received in the mounting seat for controlling the tool holder move relative to the mounting seat,
wherein the mounting seat is positioned on the moving device, at least one guiding portion is positioned on the mounting seat along a third direction, the third direction is substantially perpendicular to the first and second direction; the feeding mechanism drives the cutter to move backwards and forwards under precise control at high speed along the at least one guiding portion for machining the workpiece.

19. The lathe of claim 18, wherein a through groove is defined in the second side wall, two guiding portions are positioned on the second side wall and positioned at two sides of the through groove, the main body slidably connects with the at least one guiding portion, and the sliding board passes through the through groove.

* * * * *